United States Statutory Invention Registration [19]

[11] Reg. Number: H415

Newnham et al. [43] Published: Jan. 5, 1988

[54] MULTILAYER PTCR THERMISTOR

[75] Inventors: Robert E. Newnham, State College, Pa.; Basavaraj V. Hiremath, Lawrenceville, N.J.

[73] Assignee: The United States of America as represented by the Secretary of the Navy, Washington, D.C.

[21] Appl. No.: 44,398

[22] Filed: Apr. 27, 1987

[51] Int. Cl.[4] ..... H01C 7/10

[52] U.S. Cl. ..... 338/22 R; 338/314; 338/212; 338/203

*Primary Examiner*—Stephen C. Buczinski
*Assistant Examiner*—Linda J. Wallace
*Attorney, Agent, or Firm*—Henry Hansen

[57] ABSTRACT

A multilayer thermistor and a method of making it are disclosed. The thermistor has a positive temperature coefficient of resistance (PTCR) and a room temperature resistance lower than prior art thermistors of the same size. The thermistor is comprised of a plurality of layers of material having the PTCR characteristic laminated in alternation with layers of electrodes, the outer two layers of the thermistor being PTCR layers. Alternate electrodes are electrically connected in common to a pair of conductors forming thereby parallel resistance paths across each layer. The more resistance paths the thermistor has, the lower the overall resistance of the device.

7 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MULTILAYER PTCR THERMISTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to thermistors generally, and more particularly to multilayer thermistors which have a positive temperature coefficient of resistance (PTCR) combined with a room temperature resistance which is lower than that of previous thermistors of the same size.

PTCR thermistors are often used as thermal switches to protect devices from over-heating. They are connected in series with these devices, and when the temperature rises the thermistor's resistance also rises, cutting the flow of current to the device, thereby preventing it from heating up further. It is desirable for the thermistors to have a low resistance at room temperature, so as to interefere as little as possible with the flow of current to the device when it needs no protection.

Generally, thermistors are made in a wafer or disk shape consisting of PTCR material sandwiched between two electrodes. The PTCR material commonly used is barium titanate. It is possible to lower such a thermistor's room temperature resistivity by changing the composition of the barium titanate, but it cannot be lowered indefinitely without degrading the PTCR effect.

BRIEF SUMMARY OF THE INVENTION

It is therefore an object of the present invention to provide a thermistor which has a positive temperature coefficient of resistance as well as a lower resistance at room temperature than currently available thermistors of the same material composition and size.

Briefly, this and other objects are accomplished by a multilayer thermistor with internal electrodes. Thin layers of a material having the PTCR characteristic, such a barium titanate, are alternately laminated with thin electrodes made of a thin material such as platinum, the two outer layers of the device being of barium titanate. Alternate electrodes are electrically connected in common to a pair of conductors forming thereby parallel resistance paths across each layer. Adding resistance paths further reduces the overall resistance of the thermistor.

Other objects, advantages, and novel features of the invention will become apparent from the following detailed description of the invention when considered conjunction with the accompanying drawings wherein:

DETAILED DESCRIPTION OF THE PREFERRED EMBODIMENT

Figure 1:
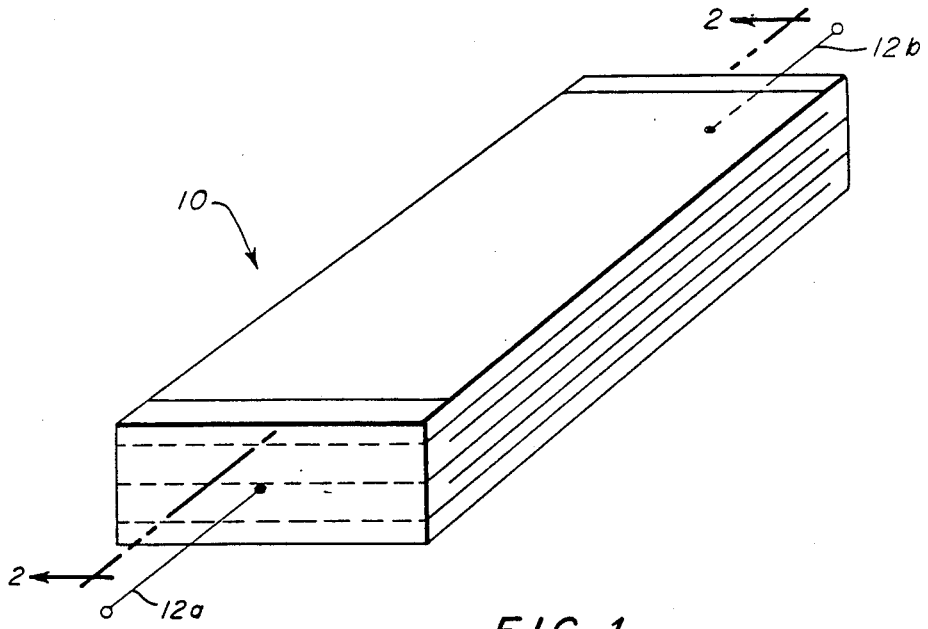
FIG. 1 is a perspective view of a preferred embodiment of a multilayer thermistor of the present invention.
Figure 2:
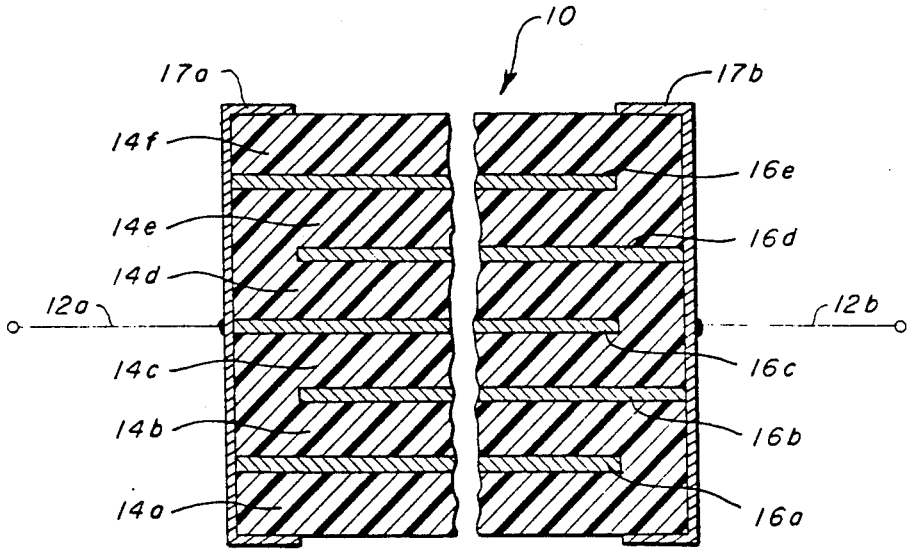
FIG. 2 is an enlarged cross-sectional view of the thermistor of FIG. 1 taken along the line 2—2.

Referring now to the drawings wherein like characters designate like or corresponding parts throughout the several views, there is shown in FIGS. 1 and 2 the multilayer thermistor 10 shown with wires 12a and 12b electrically connected according to the invention. Layers 14a–14f of a material having a PTCR, such as barium titanate, are alternately laminated with electrodes 16a–16e, made of platinum. Barium titanate layers 14a and 14f form the two outer layers, and act as a protective covering for electrodes 16a 16e respectively. For example, layers 14a–14f are one square inch in area and approximately 0.003 inches thick, while electrodes 16a–16e are one square inch in area and less than 0.0005 inches thick. Wires 12a and 12b are bonded, such as with and epoxy, via leads to electrodes 16a–16e, electrodes 16a, 16c and 16e being commonly connected by electrical terminals 17a to wire 12a, and electrodes 16b and 16d commonly connected by electrical terminals 17b to wire 12b.

Barium titanate layers 14a–14f are made from the raw materials $BaCO_3$, $La_2O_3$ and $TiO_2$. These raw materials are reacted to form the compound $BaTiO_3$, with La substituted for Ba in the proportion $(Ba_{0.9997}\ La_{0.0003})TiO_3$. A powder of this formula is prepared by taking the above ingredients and rolling them in a ball mill for approximately ten hours using zirconia grinding media. The slurry product is dried at 110° C. for approximately four hours. The dried powder is calcined at 1200° C. for about two hours using high density alumina crucibles. The calcined powder is then ball milled for about eight hours and the resulting slurry dried at 110° C. for four hours.

The powder product of the foregoing procedure is then milled with an organic solvent binder for six hours in a polyethylene jar. The slurry is then filtered to a 100 size mesh and deaerated. Tapes of the barium titanate are then case to yield a final thickness of 0.003 inches, from which are cut six one square inch pieces to form layers 14a–14f. Platinum electrodes 16a–16e are then screen printed onto layers 14a–14e, respectively, to yield a thickness less than 0.0005 inches. These five layer-electrode pairs are laminated together, and then barium titanate layer 14f is laminated to electrode 16e, so that barium titanate layers form the top and bottom surfaces of thermistor 10. Lamination is done under vaccum at 65° C., 1 psi.

The binder is next burned off by heating thermistor 10 at the rate of 4° C./hour to a peak temperature of 55° C. and holding at that temperature for two hours. Thermistor 10 is then placed on a zirconia setter and heated in air at a rate of 200° C. per hour to a temperature of 1350° C. where it is sintered for one hour. It is then cooled in the furnace.

Figure 3:
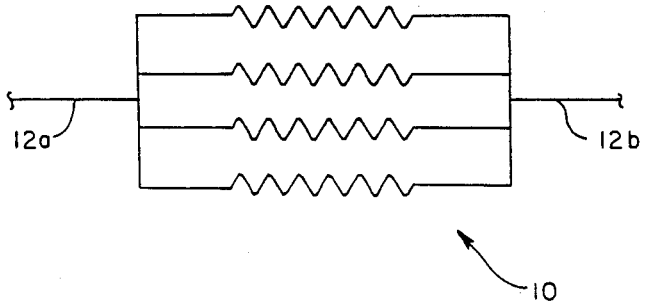
FIG. 3 is an electrical schematic of the thermistor of FIG. 1.

The edges of the sintered thermistor 10 are then lightly polished to exposed electrodes 16a–16e. The electrode edges are then coated with a silver epoxy so that silver wire leads may be attached. Electrodes 16a, 16c and 16e are commonly connected to wire 12a and electrodes 16b and 16d are commonly connected to wire 12b, resulting in four parallel resistance paths $r_1$, $R_2$, $R_3$ and $r_4$, as illustrated in FIG. 3.

Figure 4:
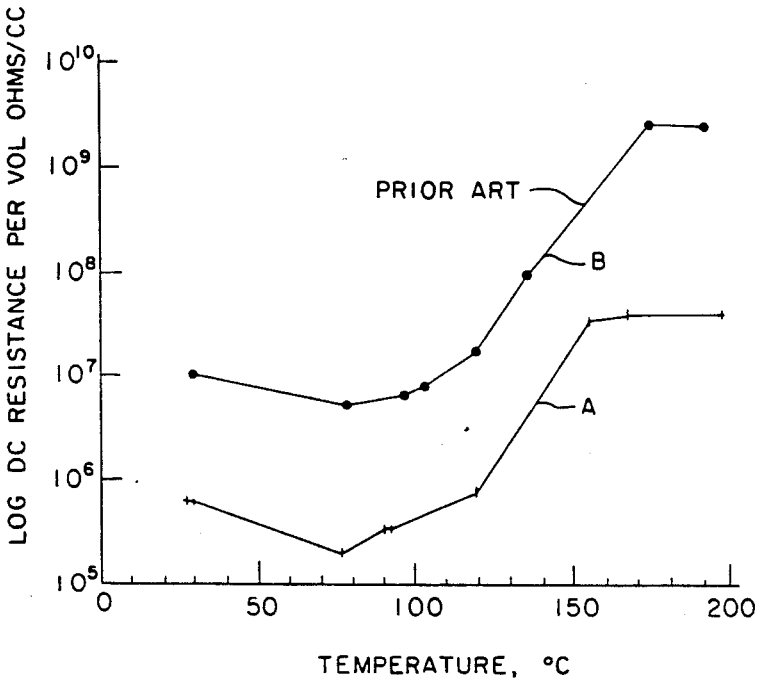
FIG. 4 is a typical graph of resistance per volume versus temperature for the thermistors.

Experimentation was performed to compare a thermistor according to the present invention to a reference specimen consisting of four layers of barium titanate of the same dimensions as the layers of the present invention laminated together and between electrodes. Resistance was measured at various temperature for both devices, and the resistance of the multilayer thermistor of the present invention was one sixteenth that of the reference specimen at all temperatures. FIG. 4 shows the log resistance per volume verses temperature curves A and B for the thermistor of the present invention and the reference specimen, respectively.

The preferred embodiment disclosed herein has the equivalent of four parallel resistance paths, reducing the resistance to one sixteenth of the resistance of a prior art thermistor. Any number of resistance paths may be included by adjuting the number of electrodes and barium titanate layers, each extra resistance path further reducing the overall resistance of the thermistor. The resistance of a single layer thermistor with two external electrodes, $R_s$, is given by Equation (1):

$$R_s = \frac{\rho t}{A} \qquad \text{Equation (1)}$$

where $\rho$ = the resistivity of the barium titanate t = the thickness of the thermistor A = the cross-sectional area of the single electroded layer.

For a multi-layer thermistor according to this invention made of the same material and having the same external dimensions as the single layer thermistor, the total electroded area is nA, where n is the number of resistance paths (or layers betweeen the outermose electrodes). The thickness of each such resistance path or layer is t/n (neglecting electrode thickness). The resistance of this multi-layer thermistor, $R_m$, is therefore given by Equation (2):

$$R_m = \frac{\rho(t/n)}{nA} = R_s/n^2 \qquad \text{Equation (2)}$$

Generally, a thermistor according to the present invention will have a resistance at room temperature equal to $1/n^2$ times the resistance of a single-layer thermistor of the same external dimensions with only two external electrodes.

Some of the many features and advantages of the invention should now be readily apparent. A thermistor has been disclosed that has a positive temperature coefficient of resistance, while at the same time has a lower room temperature resistance than currently used thermistors of the same size. The thermistor disclosed can be connected in series with devices to protect them from overheating, without impairing their effectiveness at room temperature.

Other embodiments and modifications of the present invention may readily come to those of ordinary skill in the art having the benefit of the teachings presented in the foregoing description and drawings. For instance, other materials exhibiting a PTCR may be substituted for the barium titanate. A material other than barium titanate may be used for the end layers, provided it can withstand the sintering temperature and will not chemically react with the electrodes. Other electrode materials may be used besides platinum, the limitation being that the material must be able to withstand the sintering temperature. Therefore, it is to be understood that the present invention is not to be limited to such teaching presented, and that such further embodiments and modifications are intended to be included within the scope of the appended claims.

What is claimed is:

1. A thermistor, comprising:

a plurality of layers, each layer exhibiting a positive temperature coefficient of resistance;

a plurality of electrodes, each electrode being contiguously positioned between adjacent ones of said layers; and a pair of conductors, each being electrically connected to alternate electrodes forming thereby parallel resistance paths across each of said layers.

2. A thermistor according to claim 1, wherein said layers are composed of mainly barium titanate.

3. A thermistor according to claim 1, wherein said electrodes are composed of platinum.

4. A thermistor, comprising:

a plurality of layers of barium titanate;

a plurality of platinum electrodes, each electrode being contiguously positioned between adjacent ones of said layers;

a pair of conductors, each being electrically connected to alternate electrodes forming thereby parallel resistance paths across each of said layers.

5. A method of making a thermistor, comprising the steps of:

preparing a mixture of barium titanate with a trace of lanthanum;

casting a tape from the mixture;

cutting the tape into a plurality of segments;

fixing an electrode on one side of all but one of the segments;

forming a stack of alternate layers of the segments and electrodes;

sintering the stack; and connecting alternate ones of the electrodes in common to form parallel resistance paths across each of the segments.

6. A method according to claim 5, wherein the mixture preparing step comprises:

milling $BaCO_3$, $La_2O_3$ and $TiO_2$ with a liquid medium to create a first slurry;

drying the first slurry to form a powder;

calcining the dried powder;

remilling the calcined powder with an organic solvent binder, to form a second slurry; and filtering and deaerating the second slurry to form the mixture.

7. A method according to claim 6 wherein the trace of lanthanum is in the proportion $(Ba_{0.9997}La_{0.0003})TiO_3$.

* * * * *